United States Patent [19]

Pravednikov et al.

[11] 3,843,604

[45] Oct. 22, 1974

[54] METHOD OF PRODUCING POLYPHENYLENEOXIDES-1,4 IN ALIPHATIC NITRILE SOLVENTS

[76] Inventors: Andrei Nikodimovich Pravednikov, 3 Parkovaya ulitsa, 50, korpus 2, kv. 32; Valery Vladimirovich Kopylov, Platovsky proezd, 5, kv. 56; Vladimir Mikhailovich Cherednichenko, Prospekt Mira, 122, kv. 282, all of Moscow, U.S.S.R.

[22] Filed: July 5, 1973

[21] Appl. No.: 376,902

Related U.S. Application Data

[63] Continuation of Ser. No. 20,411, March 17, 1970, abandoned.

[52] U.S. Cl. .............................. 260/47 ET
[51] Int. Cl. ............................... C08g 23/18
[58] Field of Search ....................... 260/47 ET

[56] References Cited
UNITED STATES PATENTS 3,306,875   2/1967   Hay ........................................ 260/47

*Primary Examiner*—Melvin Goldstein
*Attorney, Agent, or Firm*—Waters, Roditi, Schwartz & Nissen

[57] ABSTRACT

A method of producing polyphenyleneoxides-1,4, residing in that single-ring aromatic monooxycompounds are oxidized by oxygen in the medium of an organic solvent which is a nitrile of an aliphatic monocarboxylic acid or a nitrile of an aliphatic polybasic carboxylic acid with all the carboxylic groups substituted by nitrile groups, in the presence of a catalyst which is a cupramine complex formed by a copper salt and an amine.

3 Claims, No Drawings

METHOD OF PRODUCING POLYPHENYLENEOXIDES-1,4 IN ALIPHATIC NITRILE SOLVENTS

CROSS-RELATED APPLICATION

This application is a continuation of copending application Ser. No. 20,411, filed Mar. 17, 1970 and now abandoned.

The present invention relates to methods of producing polymer products having an aromatic ether structure of the formula

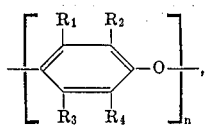

wherein $R_1$, $R_2$, $R_3$ and $R_4$ are hydrogen or halogen atoms, alkyl, aryl, alkyl halide, alkoxyl, or other groups and radicals which do not contain active hydrogen atoms; $n$ ranges from 10 to 100,000.

Such polymers, depending on the type and number of the substituents $R_i$ and on the value of $n$, have different useful properties and may find most diverse applications. Particularly, when all $R_1$ stand for hydrogen, or when some of the $R_i$ are hydrocarbon radicals, and n is equal to or greater than 100, these polymers are applicable for manufacturing films, fibers, coatings and other articles, possessing high strength, thermal and chemical stability and excellent physico-electric properties.

The known methods of producing said polyphenyleneoxides-1,4 reside in oxidizing single-ring aromatic monooxy-compounds (phenols) with oxygen or an oxygen-containing mixture of gases in the presence of a cupramine catalytic complex formed from a copper salt and on amine, in the medium of an organic solvent inert to the monomer, polymer, oxygen and catalytic complex (see U.S. Pat. Nos. 3,306,874, 3,134,753; British Pat. No. 930,993; French Pat. No. 1,322,152).

The known methods are disadvantageous in that the activity of the catalytic complex proves to be relatively low, so that it has been impossible to produce high-molecular products from all the monomeric phenols used, with the exception of 2,6-dialkylsubstituted phenols. Besides, the conversion of phenols to polyphenyloxides-1,4 is low.

The object of the present invention is to provide new process conditions for obtaining polyphenyloxides-1,4 by oxidizing single-ring aromatic monooxy-compounds with oxygen in the medium of an organic solvent in the presence of a catalyst which is a cupramine complex formed from a copper salt and an amine.

In accordance with said and other objects, the present invention comprises using as the medium for carrying out the oxidation process, an organic solvent capable of reacting with the cupramine catalyst, thereby activating it.

Such a solvent is a nitrile of an aliphatic monocarboxylic acid, or a nitrile of an aliphatic polybasic carboxylic acid wherein all the carboxylic groups are substituted by nitrile groups.

The method of the present invention is effected as follows.

A reactor is charged with a single-ring aromatic monooxycompound to be oxidized (phenol), a copper salt, amine and nitrile, then a jet of oxygen or of an oxygen-containing mixture of gases is let in, and phenol is oxidized thereby to a respective polyphenyleneoxide, the reaction mixture being stirred or shaken, the oxidation proceeding either at atmospheric pressure or at an elevated pressure, and either at room temperature, or that above it. The order in which the components are charged has no significance for the result, but it is preferable, that first the amine, nitrile and copper salt should be mixed, the catalytic complex should then be activated by oxygen, and then the solution of phenol in nitrile should be gradually added with constant feeding of oxygen.

To accelerate the oxidation process, adsorbents may be added to the reaction mixture, such as silicagel, aluminum oxide, activated charcoal, platinum black and the like, this being a known technique.

As amines in the present method use may be made of ammonia, aqueous ammonia, primary, secondary and tertiary aliphatic mono- and diamines, alkanolamines and heterocyclic compounds, containing a secondary or a tertiary nitrogen atom in the ring. As copper salts it is preferable to use cuprous oxide halides or basic cupric oxide halides, but other salts may also be used, such as copper sulphate or copper cyanide. The amine and copper salt should be taken in a molar ratio of not less than 1:1, preferably 10–50:1. The amount of nitrile used as the medium for carrying out the process is governed by the condition that all the components of the reaction mixture should be in the dissolved state, through in some cases the oxidation process may be carried out also on the suspended catalyst. In any case, the amount of nitrile should be not less (in moles) than the amount of amino used.

When the reaction is completed, which fact is indicated by the fact that oxygen is no longer consumed, or the fact that the reaction mixture has attained the required viscosity, the polymer is precipitated by adding diluted hydrochloric acid, acidified methanol or alcohol, washed with methanol, alcohol or acetone, and dried.

Given hereinbelow are examples illustrating the present invention, it being understood that the invention is not restricted thereto.

EXAMPLE 1

A four-necked flask of 200 ml capacity, provided with a stirrer, a reflux condenser, a thermometer and a gas inlet tube, is charged with 100 ml of acetonitrile, 20 ml of pyridine and 3 g of cuprous chloride. Through the mixture, oxygen is bubbled at a rate of 200 ml/min. for 15 minutes with stirring. To the resulting solution 2 g of activated charcoal are added, with platinum applied thereonto in an amount of 5 percent by weight of the charcoal, and 10 g of freshly distilled o-cresol, the stirring and bubbling of oxygen being continued. During 20 minutes the temperature of the mixture rises from 20° to 39°C. Then, for the reaction to be completed, the mixture is heated for 2 hours on a boiling water bath, after which it is filtered off to remove the charcoal. The filtrate is poured into 750 ml of diluted hydrochloric acid (1:10), the precipitated polymer is filtered off, purified by re-precipitation with methanol from a chloroform solution, and dried at room temperature. The yield of poly-2-methyl-1,4-phenyleneoxide is 6.7 g (68 percent of theory); intrinsic viscosity — 0.164 l./g (in chloroform at 25°C).

EXAMPLE 2

To 100 ml of acetonitrile in the apparatus as described in Example 1 there are added 2 g of cuprous chloride, 5 g of picoline, 2 g of activated charcoal with platinum applied thereonto (5 percent by weight of the charcoal), and 10 g of o-cresol. Through the mixture oxygen is bubbled at a rate of 200 ml/min. for 4 hours with constant stirring. After the separation, purification and drying, the yield of poly-2-methyl-1,4-phenyleneoxide is 7.7g; intrinsic viscosity is 0.52 l./g (in chloroform at 25°C).

EXAMPLE 3

To 110 ml of butyric acid nitrile there are added 20 ml of pyridine and 3 g of cuprous chloride. The mixture is stirred while oxygen is bubbled therethrough at a rate of 200 ml/min. for 17 minutes until a homogeneous blue solution is formed. Then 10 g of o-cresol are added, and the stirring is continued together with the bubbling of oxygen on a boiling water bath for 1 hour. After the separation, purification and drying 8.5 g of polymer are obtained with an intrinsic viscosity of 0.180 l./g (in chloroform at 25°C).

EXAMPLE 4

The oxidation process is carried out as described in Example 3, but with adipic acid dinitrile instead of butyric acid nitrile. 6.4 g of polymer are obtained with an intrinsic viscosity of 0.112 l./g (in chloroform at 25°C).

EXAMPLE 5

The oxidation process is carried out as in Example 3, but with the substitution of o-cresol by phenol. 6.6 g of polyphenyleneoxide-1,4 are obtained with an intrinsic viscosity of 0.12 l./g (in chloroform at 25°C).

EXAMPLE 6

The oxidation process is carried out as described in Example 3, but with the substitution of o-cresol by xylenol-2,6. 9.8 g of poly-2,6-dimethyl-1,4-phenyleneoxide are obtained with an intrinsic viscosity of 1.92 l./g (in chloroform at 25°C).

EXAMPLE 7

The oxidation process is carried out as described in Example 3, but with the substitution of cuprous chloride by cuprous bromide 8.2 g of polymer are obtained with an intrinsic viscosity of 0.180 l./g (in chloroform at 25°C).

EXAMPLE 8

To a mixture comprising 100 ml of acetonitrile and 35 ml of tributylamine there are added 2 g of basic cuprous chloride and 10 g of o-cresol. Then the mixture is intensively stirred with the help of a vibrating stirrer, and oxygen is bubbled therethrough at a rate of 200 ml/min. for 4 hours. The polymer is separated, washed and dried as described in Example 1.

The yield of poly-2-methyl-1,4-phenylenoxide is 9.2 g; its intrinsic viscosity is 0.22 l./g (in chloroform at 25°C).

The present method makes it possible to produce high-molecular products with a high yield from various single-ring aromatic monooxy-compounds.

All the polymers obtained in the above-cited Examples are soluble in benzene and chloroform, can withstand prolonged boiling with diluted acids and alkalis, are thermally stable at temperatures of 300°–400°C. The polymers obtained in Examples 2, 3 and 6 give films from a chloroform solution.

Although this invention has been described in connection with its preferred embodiment, it will be understood that various changes and variations may be resorted to by those skilled in the art without departing from the spirit and scope of the invention.

These changes and modifications are considered as falling within the scope of the invention as stated by the following claim.

What is claimed is:

1. In a method of producing polyphenyleneoxides-1,4, comprising oxidizing a single-ring aromatic monooxy-compound with oxygen in an organic solvent in the presence of a cupramine complex catalyst formed from a copper salt and an amine, an improvement according to which the organic solvent is a nitrile of an aliphatic monocarboxylic acid or of an aliphatic polybasic carboxylic acid wherein all the carboxylic groups are substituted by nitrile groups.

2. A method as claimed in claim 1 wherein the nitrile is used in a molar amount at least equal to the molar amount of amine.

3. A method as claimed in claim 1 wherein the nitrile is acetonitrile, butyric acid nitrile or adipic acid dinitrile.

* * * * *